(12) United States Patent
Roussel

(10) Patent No.: US 6,241,258 B1
(45) Date of Patent: Jun. 5, 2001

(54) METHOD OF CONTROLLING CLAMPING AND UNCLAMPING OF A HYDRAULIC CHUCK

(75) Inventor: Jacques Roussel, Le Neubourg (FR)

(73) Assignee: Gamet Precision, Le Neubourg (FR)

( * ) Notice: Subject to any disclaimer, the term of this patent is extended or adjusted under 35 U.S.C. 154(b) by 0 days.

(21) Appl. No.: 09/425,960

(22) Filed: Oct. 25, 1999

(30) Foreign Application Priority Data

Oct. 23, 1998 (FR) .................................................. 98-13319

(51) Int. Cl.⁷ ...................................................... B23B 31/30
(52) U.S. Cl. ................................ 279/4.02; 279/126; 92/5; 700/174
(58) Field of Search ................................ 279/4.02, 126; 92/5; 700/174

(56) References Cited

U.S. PATENT DOCUMENTS

| | | | |
|---|---|---|---|
| 3,815,929 | * 6/1974 | Steinberger et al. | 279/4.02 |
| 4,443,021 | * 4/1984 | Buchholz et al. | 279/4.02 |
| 4,513,979 | * 4/1985 | Silverman | 279/4.02 |
| 5,876,041 | * 3/1999 | Kuckelsberg et al. | 279/4.02 |

FOREIGN PATENT DOCUMENTS

| | | |
|---|---|---|
| 21 50 885 | 3/1973 | (DE) . |
| 24 58 958 | 6/1976 | (DE) . |

* cited by examiner

*Primary Examiner*—Steven C. Bishop
(74) *Attorney, Agent, or Firm*—Stevens, Davis, Miller & Mosher, LLP

(57) ABSTRACT

A method is disclosed of controlling a hydraulic chuck of a rotary machine tool, the chuck clamping a workpiece to be machined and being actuated by a double-acting clamping/unclamping actuator. A clamping pressure controlled in accordance with a clamping pressure set point is applied to at least one chamber of the actuator and the clamping pressure is maintained in the corresponding chamber if the control pressure upstream of the actuator suddenly falls due to a malfunction. The clamping pressure is controlled by a closed loop and is modified in the chamber to disable the aforementioned maintaining of the pressure for a predetermined time period in response to an operator request to modify the clamping force applied to the workpiece. The disabling is being at least equal to the time necessary for the control system to stabilize.

7 Claims, 5 Drawing Sheets

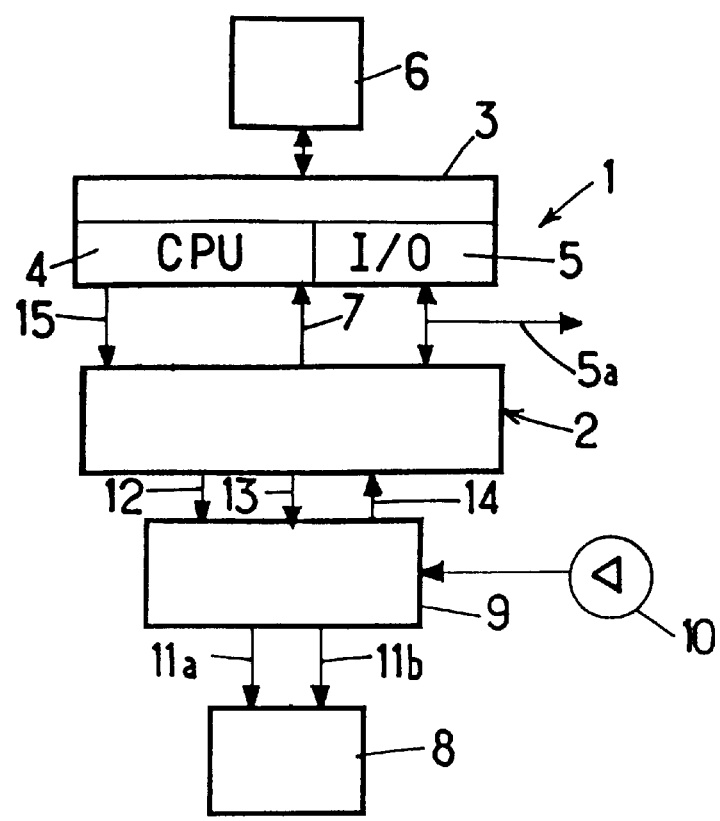
FIG.: 1
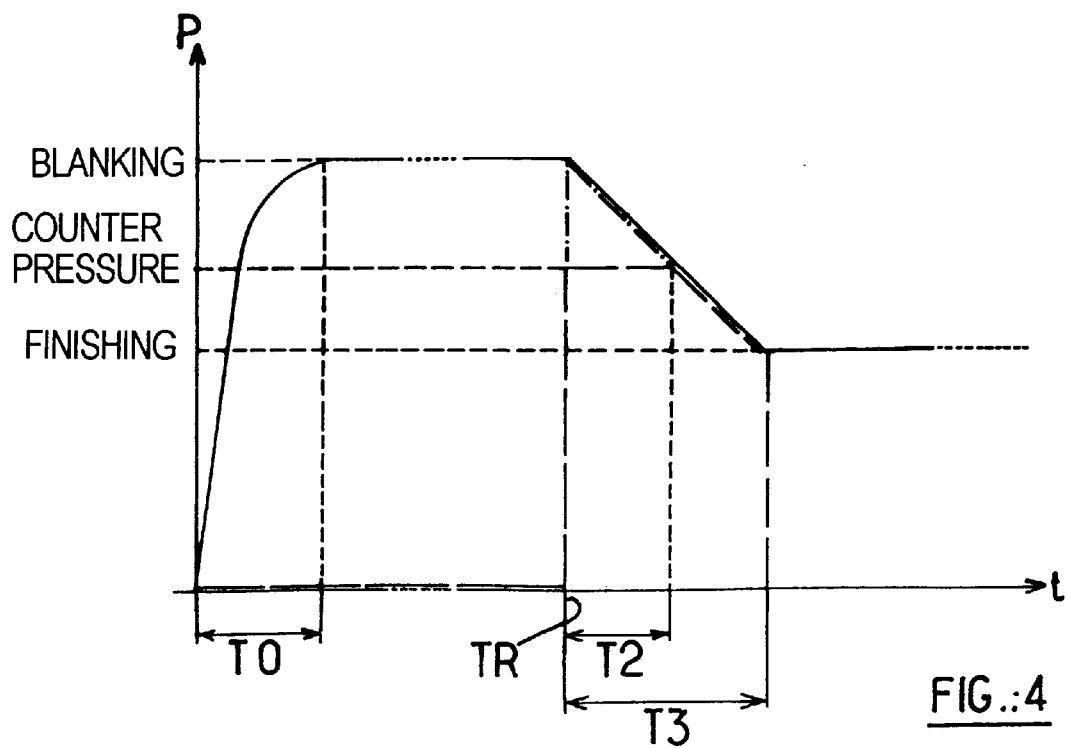
FIG.: 4

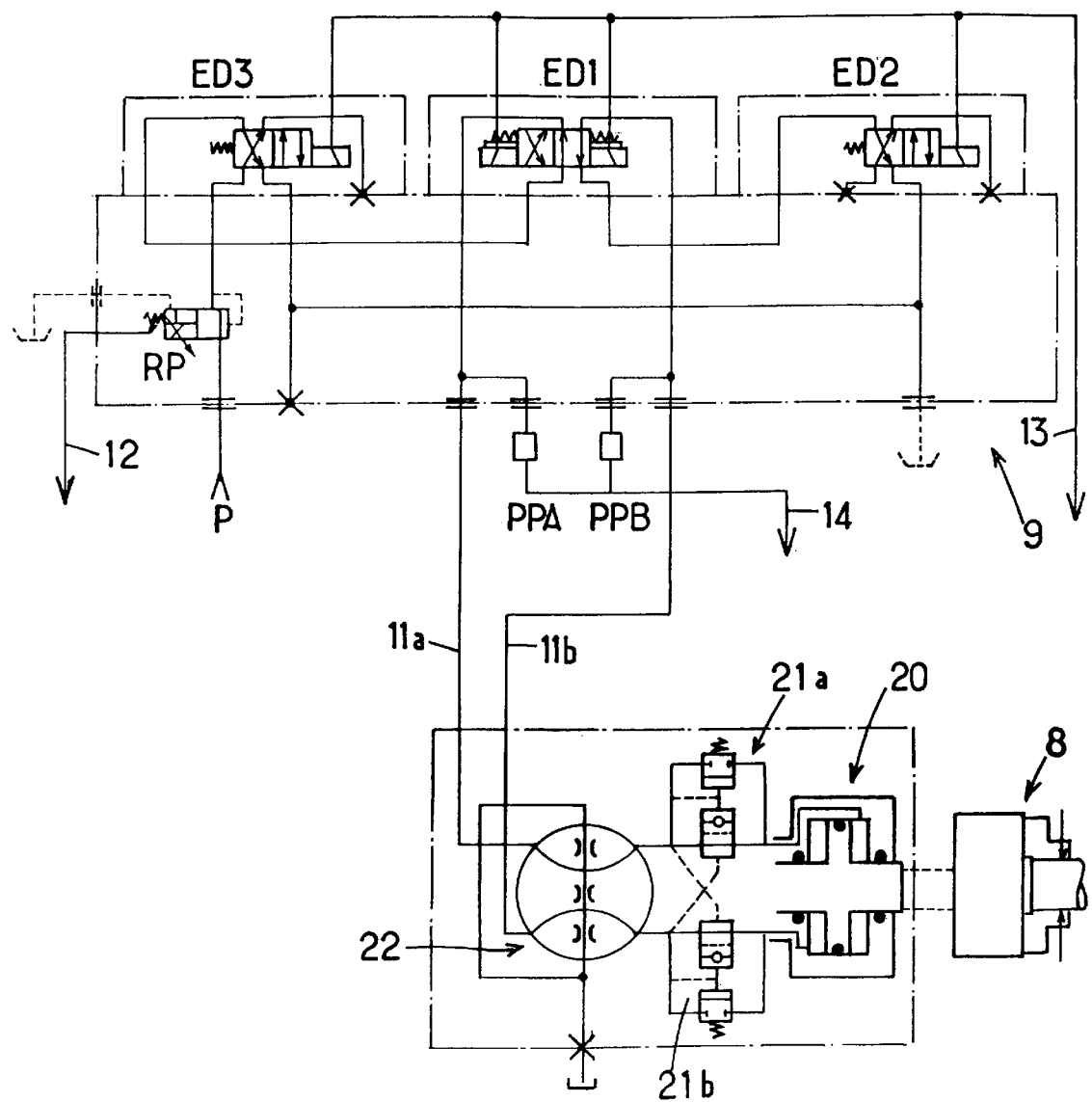
FIG.: 2

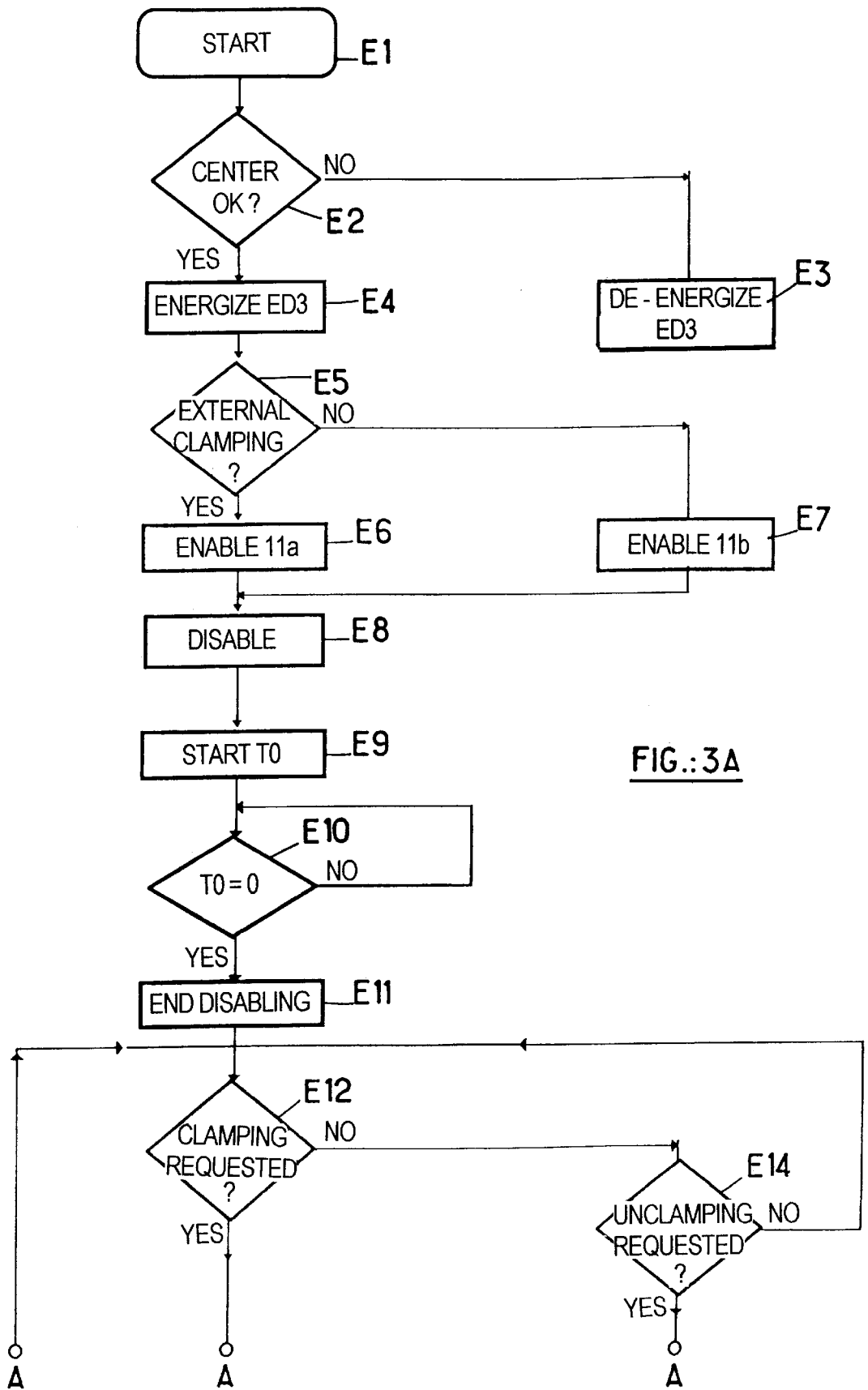

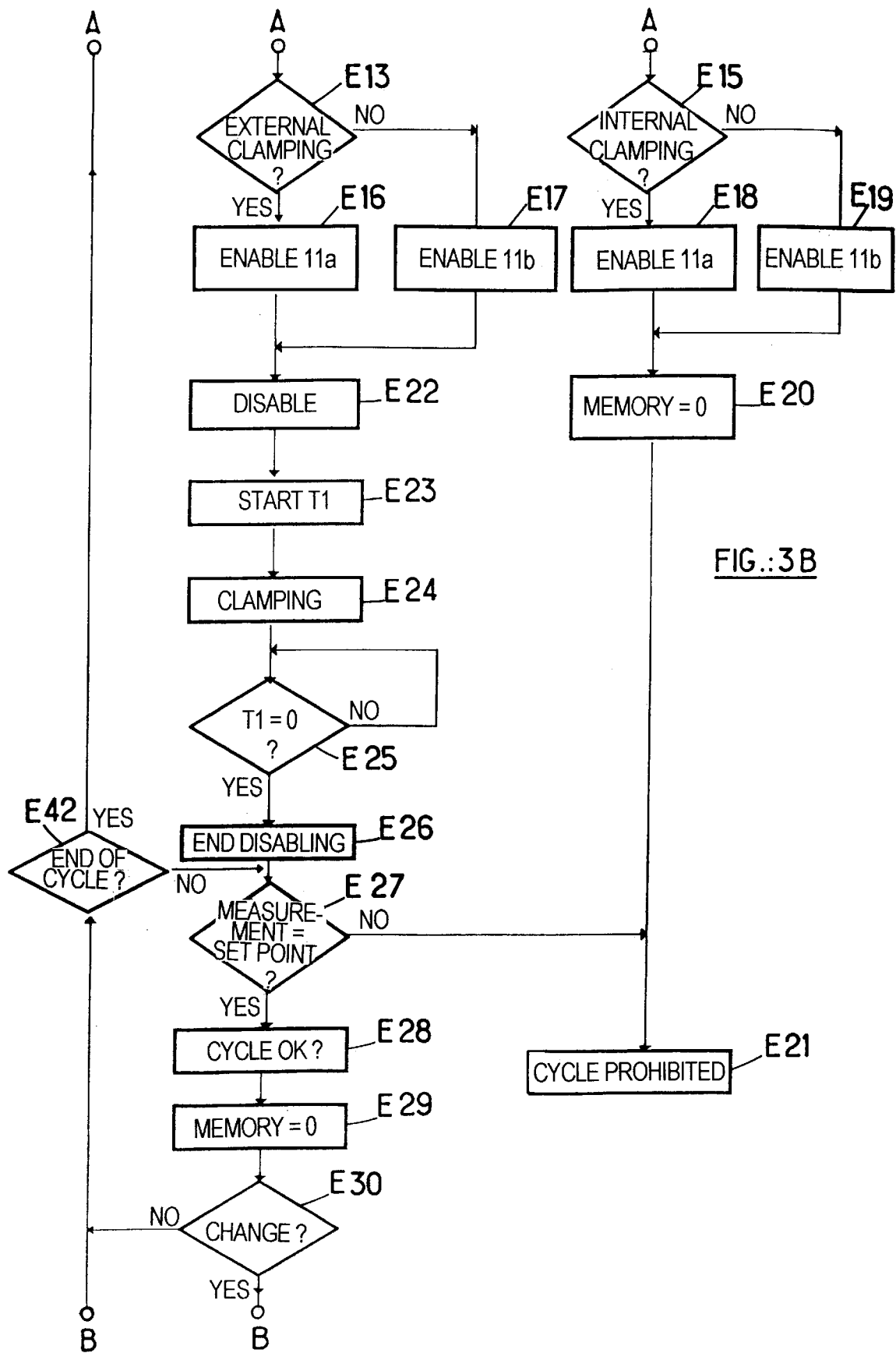
FIG.: 3B

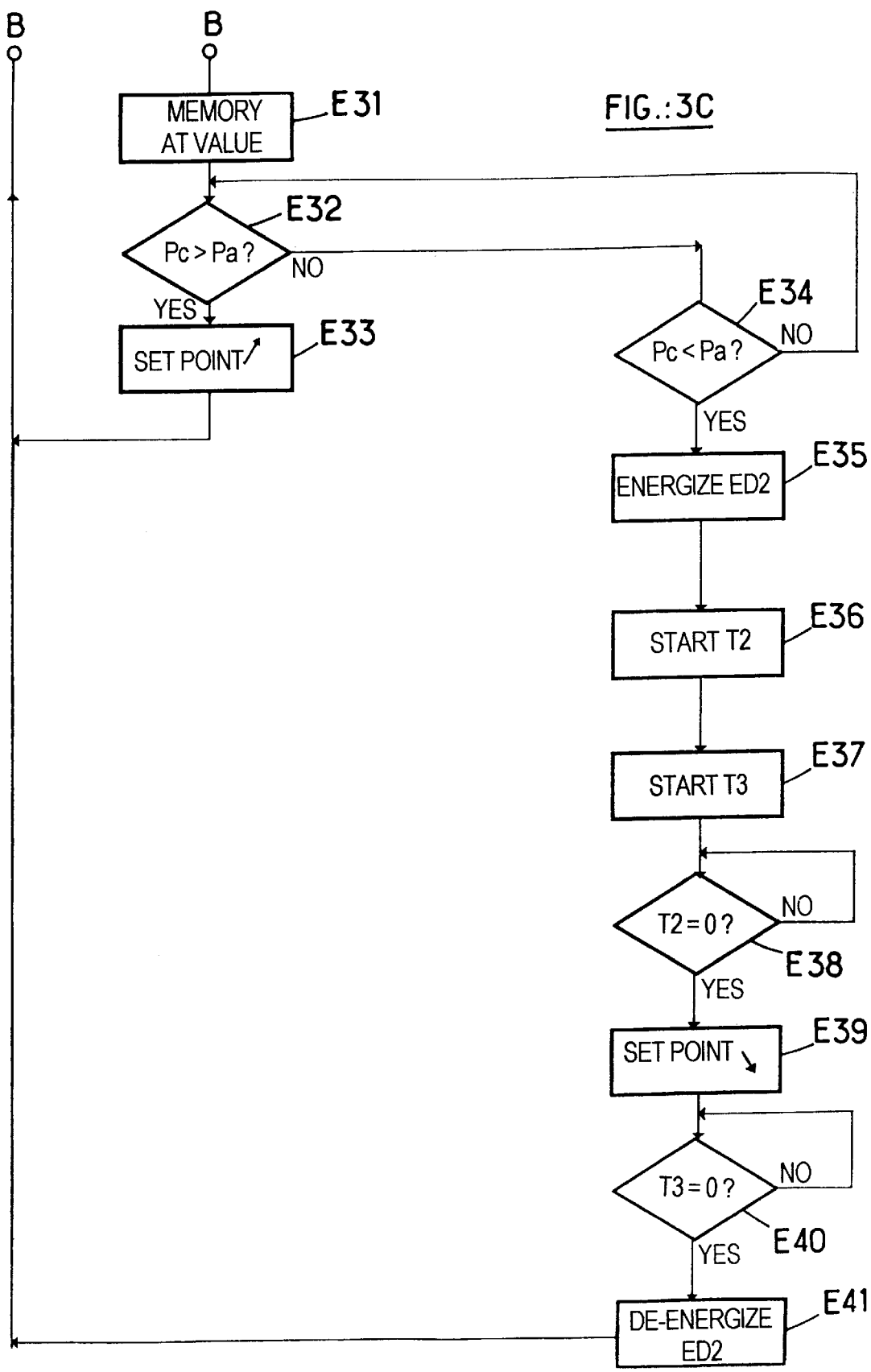
FIG.: 3C

METHOD OF CONTROLLING CLAMPING AND UNCLAMPING OF A HYDRAULIC CHUCK

BACKGROUND OF THE INVENTION

1. Field of the invention

The present invention relates to a method of controlling clamping and unclamping of a hydraulic chuck for use on machine tools on which the workpiece must be rotated in order to machine it.

2. Description of the prior art

Chucks of this type are well known in the art and one such chuck is described by assignees of the applicants in U.S. Pat. No. 5,292,139.

They are generally operated by a double-acting actuator mounted on the rotating shaft of the machine tool, actuating the jaws in a clamping or unclamping direction and coupled to a hydraulic control system controlled by a control loop. A system of this kind enables the clamping force on the workpiece to be modified during machining, for example to change from blank machining to finish machining.

The skilled person knows that blank machining, which is generally required to be completed as quickly as possible, requires a high clamping force at the chuck which cannot be maintained during finish machining, not least to prevent deformation of the workpiece, for example when it is hollow and the clamping is external to the workpiece.

Until now chucks have used an open loop to control the pressure in accordance with a pressure set point specified by the operator. However, an open loop of this kind cannot automatically track changes in the pressure and provide reliable information on correct execution of an instruction to change pressure. This goes against the need to achieve safe operation under all circumstances.

In the control engineering field, correct execution of instructions to change a control magnitude can be achieved using a closed loop comprising a feedback channel that is looped to the loop input, to which the set point signal and a signal measuring the real output are also applied.

However, the idea of applying closed loop control to a chuck of the above kind runs up against the specific problem of the presence of safety valves in the chuck. For obvious safety reasons the chuck is provided with respective safety valves in the feed pipes immediately upstream of the two chambers of the actuator to maintain the pressure therein if the feed pressure drops quickly and by a large amount, or is even lost altogether, because of any kind of operating incident. Without this precaution, the workpiece to be machined might escape from the chuck in the event of an incident.

In the event of a command to reverse the direction of the double-acting clamping actuator to clamp or unclamp the workpiece, the pressure in the chambers of the actuator varies suddenly from a relatively high value to zero, or vice versa. Under such conditions, a closed loop control system cannot establish the new pressure without a transient period, in which the pressure can take values that are difficult to control, before the loop stabilizes on the value corresponding to the new pressure in the corresponding chamber of the actuator. Any such sudden variation during the transient period may cause a high pressure that is maintained by the safety valves. The latter therefore maintain the pressure established beforehand by isolating the actuator from the hydraulic control system, which clamps up the chuck, although in reality there is no condition present necessitating operation of the safety valves.

An object of the invention is to provide a method of controlling a hydraulic chuck for rotary machine tools which does not have the drawbacks mentioned above and enables closed loop control to be used in the control system.

SUMMARY OF THE INVENTION

The invention therefore consists in a method of controlling a hydraulic chuck of a rotary machine tool, the chuck being adapted to clamp a workpiece to be machined and actuated by a double-acting clamping/unclamping actuator, the method consisting in applying to at least one chamber of said actuator a clamping pressure controlled in accordance with a clamping pressure set point and maintaining said clamping pressure in the corresponding chamber if the control pressure upstream of the actuator suddenly falls due to a malfunction, in which method the clamping pressure is controlled by a closed loop and the clamping pressure in the chamber is modified to disable maintaining of the pressure for a predetermined time period in response to an operator request to modify the clamping force applied to the workpiece, the disabling time being at least equal to the time necessary to stabilize the control.

As a result of the above features, the method can discriminate between a situation in which the modification of the clamping pressure results from an action in the context of normal operation of the chuck and an abnormal situation (for example failure of the hydraulic pressure supply) in which safety must be assured. Using the method of the invention, the safety valves can operate only when the clamping pressure is due to a system failure.

According to other features of the method in accordance with the invention:

the disabling time period is in the range from 1.5 seconds to 3 seconds;

when the chuck is adapted to clamp the workpiece internally or externally, if the operator request to modify the clamping force is a request for total clamping/unclamping of a workpiece, the disabling is applied by maintaining the clamping pressure at a value which was present prior to the operator request;

when the operator request to modify the clamping force is a request for partial reduction of the clamping force, the disabling is applied by reducing the clamping pressure in accordance with a predetermined law;

after the partial reduction request, a counter-pressure is applied in the chamber of the actuator opposite the chamber at the clamping pressure for a time period at least equal to the disabling time period;

the counter-pressure is maintained for a time-period in the range from 3 seconds to 5 seconds;

agreement of the clamping pressure in the corresponding chamber of the actuator and the clamping pressure set point is monitored and operation of the machine tool is prevented if the clamping pressure differs from the clamping pressure set point.

Other features and advantages of the invention will become apparent during the following description which is given by way of example only and with reference to the accompanying drawings.

BRIEF DESCRIPTION OF THE DRAWINGS

FIG. 1 is a block diagram of a control system for a hydraulic chuck designed to use the control method of the invention.

FIG. 2 is a simplified diagram of the hydraulic part of the control system shown in FIG. 1.

FIGS. 3A, 3B and 3C together constitute a flowchart which can be implemented in the control module that is part of the control system shown in FIG. 1 and illustrate the method of the invention.

FIG. 4 is a graph of pressure as a function of time showing important phases in the execution of the method of the invention.

DETAILED DESCRIPTION OF THE PREFERRED EMBODIMENT

FIG. 1 shows, by way of example, a control system of a hydraulic chuck designed to implement the method of the invention.

The control system 1 includes a control module 2 well known in the art including a control loop using feedback to provide at its output a magnitude controlled in accordance with a set point signal applied to its input. Persons skilled in the art refer to a loop of this kind as a "closed" loop. To provide a more concrete example, the control module can be a Siemens DR 19 control module or an OMRON CPM1A control module.

In the present case, in which the chuck controlled by the system shown in FIG. 1 is incorporated into a digitally controlled machine tool, the module 2 is interconnected with the digital controller 3 comprising a central processor unit (CPU) 4 and input/output interfaces 5 for exchanging information with the control module 2. These interfaces also communicate via a line 5a with the operating units of the machine tool (not shown) other than the hydraulic chuck and with an operator control console 6. These components of the control system do not constitute part of the invention and are not described in detail.

Note also that the control module 2 sends a measurement signal representative of the pressure applied to the chuck to the CPU 4 via a line 7. This signal enables the corresponding value to be displayed on a screen (not shown) of the console 6.

The chuck 8 is connected by two pipes 11a and 11b to a hydraulic unit 9 fed by a hydraulic pressure supply 10. The hydraulic unit 9 is connected to the control module 2 by a first control line 12 carrying the output signal of the control loop of the module 2. A line 13 applies electrodistributor control signals to the unit and a line 14 transmits to the module 2 a pressure measurement signal depending on the current pressure present in one or other chamber of the actuator of the chuck 8. The control module 2 also receives an analog pressure signal via a line 15.

FIG. 2 is a more detailed hydraulic diagram of the chuck 8 and the hydraulic unit 9.

The chuck 8 is operated by a double-acting actuator 20 whose piston is connected to the controller of the chuck 8. The assembly is fixed to the rotary shaft (not shown) of the machine tool. The chambers of the actuator 20 are connected to the pipes 11a and 11b via respective safety valves 21a and 21b and a rotary joint 22. Respective pressure sensors PPA and PPB are connected to the pipes 11a and 11b to measure the clamping pressures and transfer the corresponding electrical signals to the module 2 via the line 14 (FIG. 1)

It should be noted that the chuck is designed for "external" or "internal" clamping of workpieces on their outside surface or their inside surface, respectively, if the workpiece includes an internal bore. This is why, as appropriate and at the choice of the operator, the clamping and unclamping pressure in the line 11a or 11b and therefore in the chambers of the actuator can depend on the status of a clamping control electrodistributor ED1 in the hydraulic unit 9.

The latter unit also includes a proportional pressure reducer RP referred to hereinafter as the "control valve RP". This valve is connected via a connection P to the hydraulic supply 10 and to another electrodistributor ED3 controlling the supply. The valve RP is connected electrically to the line 12 (FIG. 1) and therefore receives an electrical signal which corresponds to the output of the control module 2.

A third electrodistributor ED2 is connected to the electrodistributor ED1 so that it can apply a reaction force to the jaws of the chuck to facilitate releasing the force clamping the workpiece to be machined.

Electrical control signals from the module 2 are fed to the electrodistributors ED1, ED2 and ED3 via the line 13 (FIG. 1).

FIGS. 3A, 3B and 3C represent a flowchart of the program executed by the CPU 4 to implement the method of the invention.

After starting the program (step El), a test is conducted (step E2) to verify correct operation of the hydraulic supply 10. If the test result is negative, energization of the electrodistributor ED3 is disabled by step E3, which prevents operation of the chuck. If the test result is positive, the electrodistributor ED3 is energized via the line 13 (step E4) and the supply pressure is applied to the electrodistributor ED1.

Step E5 tests a location of the memory of the unit 3 which stores a bit representing the clamping mode (external or internal) of the chuck 8 prior to step E1. If this bit is at "1", the clamping mode was external, the test result is positive and measurement of the pressure in the pipe 11a (external clamping) by the sensor PPA is enabled in step E6. The measured value constitutes the real pressure value applied to the control module 2. Otherwise, the clamping mode was internal and in this case step E7 enables measurement by the sensor PPB of the pressure in the pipe 11b (internal clamping).

Step E8 reads in the memory of the unit 3 an earlier value of the clamping pressure, i.e. the clamping pressure when the system was stopped the previous time. This value is maintained at the output of the control loop of the module 2 for a predetermined time, the control loop being temporarily disabled.

The time for which the control loop is disabled is determined by a time-delay T0 (see also FIG. 4) which is started during step E9. This time-delay can have a duration in the range from 1.5 seconds to 3 seconds, for example, and prevents any pressure variations in either chamber of the actuator 20 tripping the safety valve 22a or 22b, as appropriate.

Step E10 tests if the time-delay has finished. If it has, the control loop is re-enabled in step E11 and the pressure in the corresponding chamber of the actuator 2 is adjusted, if necessary. The system is then initialized and waits for an operator request to clamp or unclamp the chuck 8.

If a test performed in step E12 shows that the operator has requested clamping (by means of a control button on the control panel 6), the program performs another test in step E13 to verify if the request is for external clamping. If the test performed in step E12 shows that the operator has not requested clamping, the program performs a test for an unclamping request in step E14. If there is no unclamping request either, the program returns to step E12 and the cycle of verifying clamping/unclamping requests is repeated until an operator request is received. An affirmative response to test E14 indicates a request for unclamping and the program proceeds to test E15.

If the test in step E13 indicates external or internal clamping, pressure measurement in pipe 11a or 11b is respectively enabled in steps E16 or E17. If appropriate, after the test in step E15 analogous enabling is performed in respective steps E18 and E19.

When the operator has requested unclamping of the chuck, as confirmed by step E14, the unclamping pressure is applied to the corresponding chamber of the actuator in step E20. This is followed in step E21 by prohibiting operation of the machine tool, because the chuck is open.

If the operator has requested clamping, on the other hand, as indicated by the test in step E12, the program disables the control function of the module 2 for a time period that corresponds to that of the transient period in which the control loop stabilizes (step E22) Triggering the clamping operation requires switching of the pressure between the two chambers of the double-acting actuator, which here could also trip the safety valves 22a and 22b during the period in which the control loop stabilizes.

Consequently, the current pressure is maintained at the output of the control module 2, which enables the actuator 20 to move the jaws of the chuck toward each other (step E24). Step 22 also triggers a second timedelay T1 in step E23 having a duration in the range from 1.5 seconds to 3 seconds, for example, sufficient to cover the transient period of the control function. During this short period, the safety valves do not detect any pressure fault and their action of maintaining the pressure is disabled.

The test in step E25 verifies if the time-delay T1 has finished. If the test result is positive, disabling of the control function is cancelled in step E26.

The program then enters a phase during which the workpiece can be machined. This phase begins with a test in step E27 to check the clamping pressure and during which the set point pressure applied to the module 2 via the line 16 is compared to the real pressure in the corresponding chamber of the actuator. If the response to this test is negative, there is a fault in the installation and the program moves to step E21 to prohibit operation of the machine tool.

If the result of the test in step E27 is positive, on the other hand, operation of the machine tool is authorized in step E28 and the operator can begin to blank the workpiece to be machined. The location of the memory of the central unit 4 in which the preceding chamber pressure was stored is reset to zero in step E29.

The program then waits for an operator request to change the clamping pressure, this request being monitored by the test in step E30. Each time the result of the test in step E30 is negative, the program loops to operation E27. Thus the system constantly verifies the consistency of the set point pressure and the real pressure applied to the actuator 20 as determined by the sensor PPA which measures the pressure in the pipe 11a, within a certain tolerance (for example up to 3%).

If step E30 indicates an operator request to change the pressure, the requested new value is stored in memory at the aforementioned location storing the pressure (step E31).

The program performs a test in step E32 to verify if the requested pressure is higher than the current pressure. If it is, the set point value of the control loop is increased accordingly in step E33 and the clamping pressure is adjusted. The program then loops to the pressure checking operation (step E27).

If the result of test E32 is negative, the program verifies in step E34 if the requested new pressure is less than the current pressure. If the result is negative, the program loops to step E32.

Otherwise, the method of the invention executes a series of operations constituting another important feature of the invention. Note that, in the present context, there may be frequent requests to reduce the clamping pressure because this request is formulated each time that the operator changes from blanking a workpiece to finishing it. It is frequently necessary to reduce the clamping force during finish machining to avoid deforming the workpiece, which has been made more fragile by the blanking operation. Using the method of the invention, the change from one workpiece machining phase to the other can be carried out while the chuck is rotating.

Consequently, using the invention, the reduction in the clamping pressure is accompanied by the application of a counter-pressure on the side of the piston of the actuator 20 opposite that at the clamping pressure by shutting off the hydraulic return of the rotary joint 22 which is designed to generate a rise in pressure in the chamber opposite the pressure feed. This facilitates reducing the clamping force.

To obtain the counter-pressure, the program commands energizing the electrodistributor ED2 during step E35 and simultaneously starts two time-delays T2 and T3 constituting program steps E36 and E37. The time-delay T2 can be in the range from 1 second to 1.5 seconds, for example, and the time-delay T3 can be in the range from 3 seconds to 5 seconds.

The FIG. 4 graph shows the evolution of the clamping pressure, time TR being the time at which the transition from the blanking clamping pressure to the finishing clamping pressure begins. As soon as the electrodistributor ED2 changes state, the chamber of the actuator opposite that at the clamping pressure is shut off. At the same time, the clamping pressure is reduced under the control of the control loop and in accordance with a predetermined rate of reduction. This rate is chosen so that the safety valve 22a or 22b cannot close and here again its action is temporarily disabled.

The time-delay T2 is monitored during step E38 after which the pressure set point applied to the control loop is reduced during step E39 to the value selected by the operator. The clamping pressure continues to fall to the value required for the workpiece. The time-delay T3 is monitored in step E40 and the electrodistributor ED2 is released in step E41 at the end of the time-delay T3. The operator can then perform the finishing machining and the program loops to program step E42.

This step looks out for an end of machining cycle command from the operator. If the test result is negative, the program loops to step E27 to check the set point pressure. On the other hand, as soon as the test in step E42 detects an end of machining cycle command, the program loops to the test of step E12 so that a new machining cycle can be carried out.

There is claimed:

1. A method of controlling a hydraulic chuck of a rotary machine tool, said chuck being adapted to clamp a workpiece to be machined and actuated by a double-acting clamping/unclamping actuator, the method consisting in applying to at least one chamber of said actuator a clamping pressure controlled in accordance with a clamping pressure set point and maintaining said clamping pressure in the corresponding chamber if the control pressure upstream of said actuator suddenly falls due to a malfunction, in which method said clamping pressure is controlled by a closed loop and said clamping pressure in said chamber is modified to disable maintaining of said pressure for a predetermined time period in response to an operator request to modify the clamping force applied to said workpiece, the disabling time being at least equal to the time necessary to stabilize said control.

2. The control method claimed in claim 1 wherein said disabling time period is in the range from 1.5 seconds to 3 seconds.

3. The control method claimed in claim 1 wherein, when said chuck is adapted to clamp said workpiece internally or externally, if said operator request to modify said clamping force is a request for total clamping/unclamping of said workpiece, said disabling is applied by maintaining the clamping pressure at a value which was present prior to said operator request.

4. The control method claimed in claim 1 wherein, when said operator request to modify said clamping force is a request for partial reduction of said clamping force, said disabling is applied by reducing said clamping pressure in accordance with a predetermined law.

5. A control method as claimed in claim 4 wherein, after said partial reduction request, a counter-pressure is applied in the chamber of said actuator opposite that at said clamping pressure for a time period at least equal to said disabling time period.

6. The control method claimed in claim 5 wherein said counter-pressure is maintained for a time period in the range from 3 seconds to 5 seconds.

7. A control method as claimed in claim 1 wherein agreement of said clamping pressure in the corresponding chamber of said actuator and said clamping pressure set point is monitored and operation of said machine tool is prevented if said clamping pressure differs from said clamping pressure set point.

* * * * *